United States Patent
Mortensen

Patent Number: 5,871,310
Date of Patent: Feb. 16, 1999

[54] DEVICE FOR AND METHOD OF ENLARGING AND CENTER DISPLACING AN OPENING IN A WORK PIECE

[76] Inventor: Robert Mortensen, 4688 NW. 103 Ct., Miami, Fla. 33178

[21] Appl. No.: 46,025

[22] Filed: Mar. 23, 1998

[51] Int. Cl.$^6$ .................................................. B23B 35/00
[52] U.S. Cl. ................... 408/1 R; 408/72 B; 408/72 R; 408/204; 408/241 B
[58] Field of Search ................... 408/204, 72 R, 408/72 B, 241 B, 1 R

[56] References Cited

U.S. PATENT DOCUMENTS

| | | | |
|---|---|---|---|
| 2,819,630 | 1/1958 | Whittaker | 408/72 R |
| 3,011,369 | 12/1961 | Russell | 408/72 R |
| 4,131,385 | 12/1978 | Narang | 408/241 B |
| 4,280,776 | 7/1981 | Chaconas et al. | 408/72 R |
| 4,307,983 | 12/1981 | Blough et al. | 408/80 |
| 4,579,486 | 4/1986 | Damico | 408/204 |
| 4,971,484 | 11/1990 | Specktor | 408/72 R |
| 5,143,489 | 9/1992 | Bogner et al. | 408/72 B |
| 5,366,326 | 11/1994 | Converse | 408/72 B |
| 5,415,502 | 5/1995 | Dahlin | 408/72 B |
| 5,664,913 | 9/1997 | Scholz | 408/72 B |

*Primary Examiner*—Steven C. Bishop
*Assistant Examiner*—Adesh Bhargava
*Attorney, Agent, or Firm*—Michael I. Kroll

[57] ABSTRACT

A device (10) for use in combination with a hole saw (12) of the type including a cylindrical hollow body (14) having a circular lower cutting edge (16), a top mandrel (18) with a shank (20) in engagement with a chuck (22) of a drill (24) and a pilot bit (26) for guiding the hole saw (12) when cutting a new opening in a workpiece (28) having a predrilled opening (30), in which the center of the new opening lies within the predrilled opening (30). The device (10) comprises a dowel plug (32) having a plurality of holes (34) therethrough. The dowel plug (32) is inserted into the predrilled opening (30), so that the pilot bit (26) of the hole saw (12) can be positioned in a rotatable manner into one of the holes (34) in the dowel plug (32) on center or off center with the predrilled opening (30) in the workpiece (28).

18 Claims, 6 Drawing Sheets

DEVICE FOR AND METHOD OF ENLARGING AND CENTER DISPLACING AN OPENING IN A WORK PIECE

BACKGROUND OF THE INVENTION

1. Field of the Invention

The instant invention relates generally to hole boring tools and more specifically it relates to a device for and method of enlarging and center displacing a predrilled opening in a workpiece. The device for and method of precision enlarging and center displacing a predrilled opening in a workpiece can guide a hole saw to enlarge the predrilled opening in a work piece, either on center or off center with the predrilled opening. The device for and method of enlarging and center displacing a predrilled opening in a workpiece consists of a tapered knurled dowel plug having a concave cutout side less than a one hundred and twenty degree angle, to be snugly inserted quickly and safely into the predrilled opening in the work piece. A central hole and a plurality of spiral radiating repositioning center holes each act as a guide hole for the pilot drill bit of the hole saw. The concave (optionally straight or convex) cutout side will prevent the hole saw, when off center from the predrilled opening, from causing damage to the tapered knurled dowel plug.

2. Description of the Prior Art

Numerous hole boring tools have been provided in prior art. For example, U.S. Pat. No. 4,579,486 to Damico; U.S. Pat. No. 5,074,722 to Cochran; U.S. Pat. No. 5,366,326 to Converse and U.S. Pat. No. 5,658,102 to Gale all are illustrative of such prior art. While these units may be suitable for the particular purpose to which they address, they would not be as suitable for the purposes of the present invention as heretofore described.

DAMICO, GEORGE

HOLE SAW GUIDE

U.S. Pat. No. 4,579,486

A hole saw guide positions a hole saw while forming a new hole either partially overlapping or surrounding an existing hole in a workpiece. The hole saw guide includes a disc-shaped body having a pilot drill guide hole through the center sized to guide the pilot drill of a conventional hole saw. Two or more guide arms extend radially outwardly from the body and have outer ends which engage the inner circumference of an existing hole in the work piece to secure the guide at a desired position. The guide arms are adjustable in length radially so the pilot drill guide hole in the body can be positioned where desired. The pilot drill of a conventional hole saw is then inserted into the pilot drill guide hole which properly centers the hole saw, so that the new hole formed in the work piece is properly located.

COCHRAN, PAUL

HOLE CUTTER

U.S. Pat. No. 5,074,722

A rotary cutting device for cutting holes in a workpiece and a method of making a rotary cutting device. The method includes machining a notch across a face of a generally cylindrical body. The body has a longitudinally extending central axis and a central bore formed concentric therewith. Machining the notch forms at least one generally arcuate protrusion on a face of the body. A slot is formed through each of the protrusions resulting in two teeth being formed on either side of the mouth of the slots. A cutting tooth and a stabilizing tooth is formed on each side of the mouth of each slot formed in the body. The cutting tooth removes material from the workpiece and the stabilizing tooth limits the feed rate and prevents grabbing when a rotary motion is applied thereto.

CONVERSE, JEFFREY M.

HOLE SAW GUIDE

U.S. Pat. No. 5,366,326

A hole saw guide for alignment of a hole saw used to enlarge an existing hole. The hole saw guide includes a perforated cylindrical plug fitted to an existing hole. The perforation accepts the hole saw pilot drill member permitting free rotation. The perforated cylindrical plug includes a stop which prevent passage of the plug through the existing hole. The hole saw guide may include mechanisms for diametric adjustment to lock the plug in the existing hole.

GALE, RONALD D.

HOLE SAW ARBOR METHOD AND APPARATUS

U.S. Pat. No. 5,658,102

A hole saw arbor includes an arbor body defining an axial rotation axis and has, at one end, a shank for mounting to a drill chuck, and at the other end, a hole saw receiving, axially directed, threaded shaft. The arbor includes a thrust member coaxially received by the arbor body such that the thrust member is movable in the direction of the rotation axis. The arbor further has at least one movable pin retained by the arbor body in the direction of the threaded shaft for engaging a corresponding hole in a bottom surface of the hole saw, to prevent rotation of the hole saw relative to the arbor body, and an adjustable locking member for locking the thrust member against the bottom surface of the hole saw. Thereby the hole saw, when engaged by the trust member and the at least one pin, does not wobble off-axis.

SUMMARY OF THE INVENTION

A primary object of the present invention is to provide a device for and method of enlarging and center displacing a predrilled opening in a workpiece that will overcome the shortcomings of the prior art devices.

Another object is to provide a device for and method of enlarging and center displacing a predrilled opening in a workpiece that can guide a hole saw to enlarge the predrilled opening in a workpiece, either on center or off center with the predrilled opening.

An additional object is to provide a device for and method of enlarging and center displacing a predrilled opening in a workpiece that consists of a tapered knurled dowel plug having a concave cutout side less than a one hundred and twenty degree angle, to be snugly inserted safely into the predrilled opening in the workpiece, a central hole and a plurality of spiral radiating repositioning center holes each act as a guide hole for the pilot drill bit of the hole saw, while the concave cutout side will prevent the hole saw, when off center from the predrilled opening, from causing damage to the tapered knurled dowel plug.

A further object is to provide a device for and method of enlarging and center displacing a predrilled opening in a workpiece that is simple and easy to use.

A still further object is to provide a device for and method of enlarging and center displacing a predrilled opening in a workpiece that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
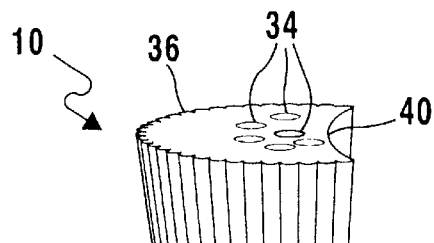
FIGS. 1 through 4 are perspective view of the present invention, showing dowel plugs of different sizes.
Figure 2:
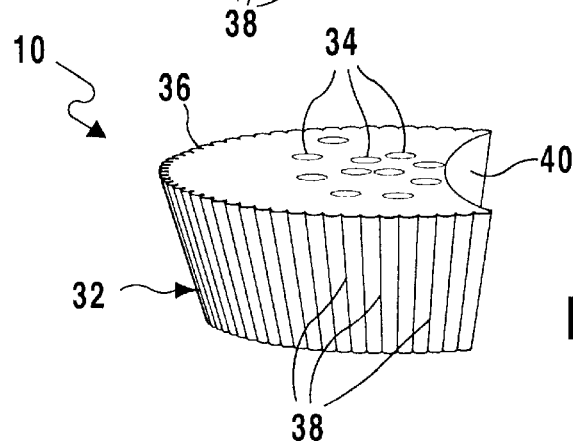
Figure 3:
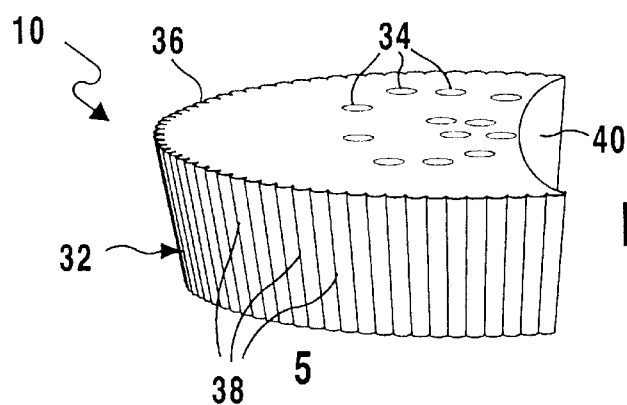
Figure 4:
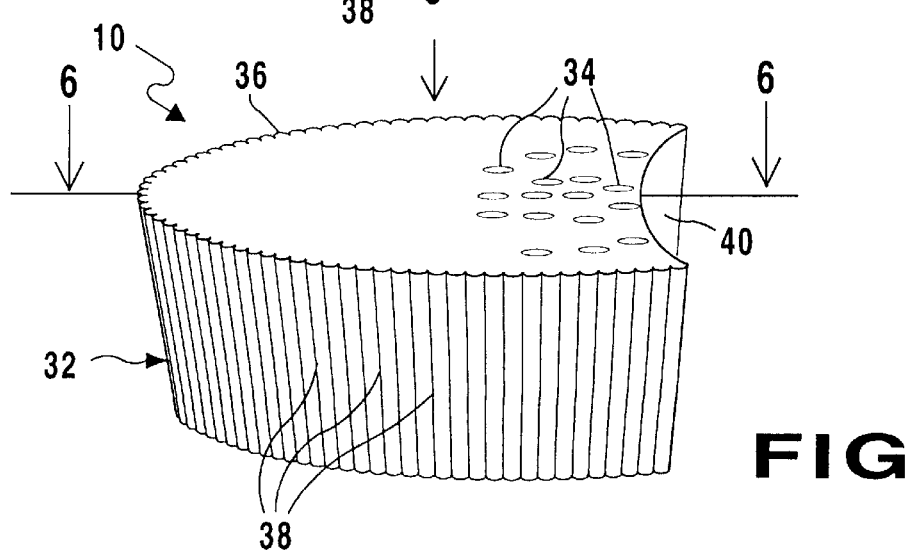
Figure 5:
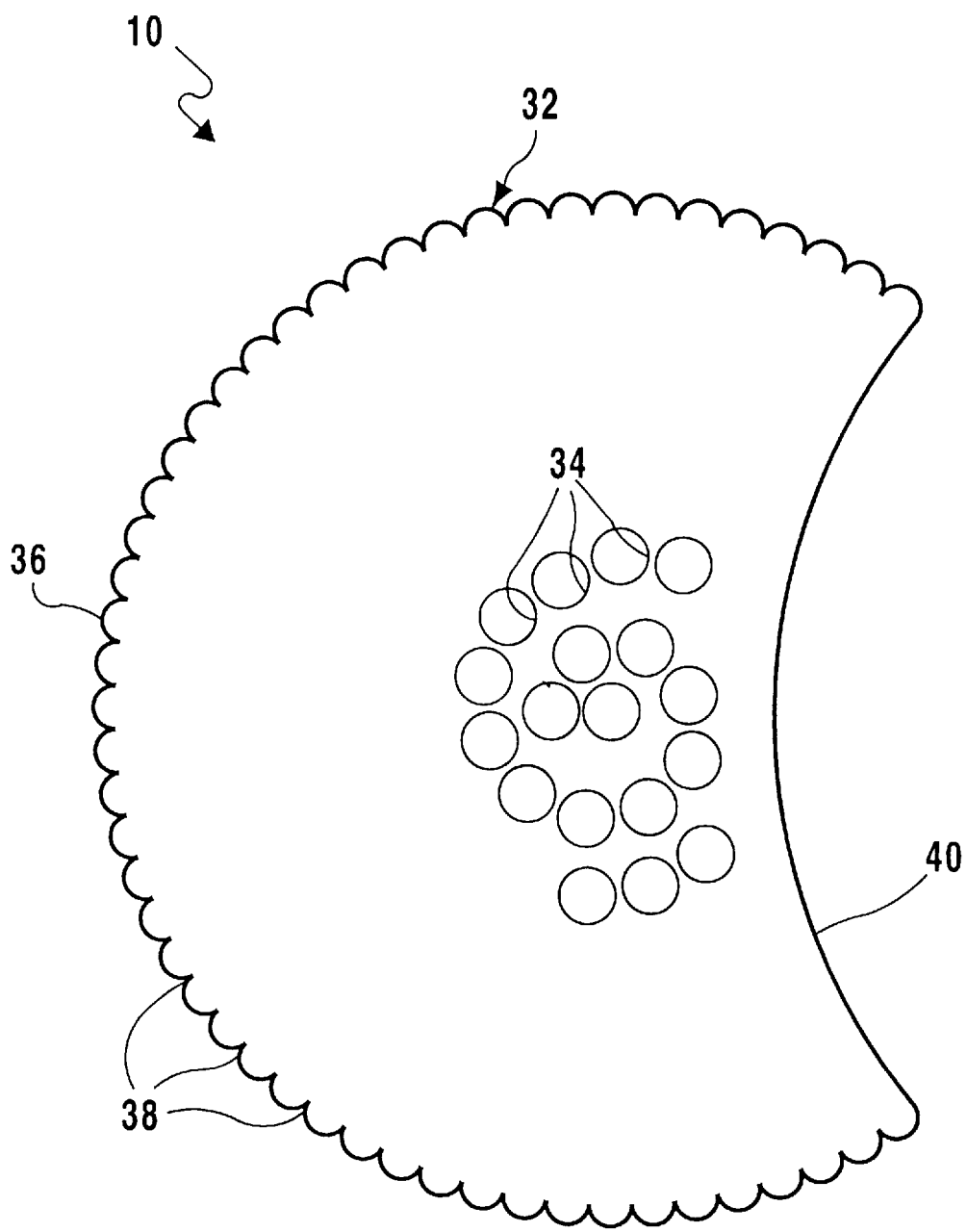
FIG. 5 is a top plan view taken in the direction of arrow 5 in FIG. 4.

Turning now descriptively to the drawings, in which similar reference characters denote similar elements throughout the several views, FIGS. 1 through 8 illustrate the present invention being a device 10. With regard to the reference numerals used, the following numbering is used throughout the various drawing figures.

| | |
|---|---|
| 10 | device |
| 12 | hole saw |
| 14 | cylindrical hollow body of 12 |
| 16 | circular lower cutting edge on 14 |
| 18 | top mandrel of 12 |
| 20 | shank on 18 |
| 22 | chuck of 24 |
| 24 | drill |
| 26 | pilot bit of 12 |
| 28 | workpiece |
| 30 | predrilled opening in 28 |
| 32 | dowel plug of 10 |
| 34 | hole in 32 |
| 36 | inwardly tapered circumference on 32 |
| 38 | knurl on 36 |
| 40 | concave cutout side in 36 |
| 42 | strong durable material (plastic) for 32 |

The device 10 is for use in combination with a hole saw 12 of the type including a cylindrical hollow body 14 having a circular lower cutting edge 16. A top mandrel 18 with a shank 20 is in engagement with a chuck 22 of a drill 24. A pilot bit 26 is for guiding the hole saw 12 when cutting a new opening in a workpiece 28 having a predrilled opening 30, in which the center of the new opening lies within the predrilled opening 30. The device 10 comprises a dowel plug 32 having a plurality of holes 34 therethrough. The dowel plug 32 is inserted into the predrilled opening 30, so that the pilot bit 26 of the hole saw 12 can be positioned in a rotatable manner into one of the holes 34 in the dowel plug 32 on center or off center with the predrilled opening 30 in the workpiece 28.

The dowel plug 32 includes an inwardly tapered circumference 36, so that the dowel plug 32 can snugly fit into, but not pass through, the predrilled opening 30 in the workpiece 28. A plurality of knurls 38 are formed on the inwardly tapered circumference 36, to aid in gripping an inner surface of the predrilled opening 30 in the workpiece 28. The inwardly tapered circumference 36 has a concave cutout side 40 less than a one hundred and twenty degree angle, to prevent the hole saw 12 when off center from the predrilled opening 30 from causing damage to the dowel plug 32, when cutting the new opening in the workpiece 28.

One of the holes 34 in the dowel plug 32 is centrally located in a concentric relationship with the predrilled opening 30 in the workpiece 28. The other holes 34 in the dowel plug 32 are in spiral radiating locations about the centrally located hole 34, so as to allow for finer repositioning and more varied positions for the pilot bit 26 of the hole saw 12, when cutting the new opening in the workpiece 28.

Figure 6:
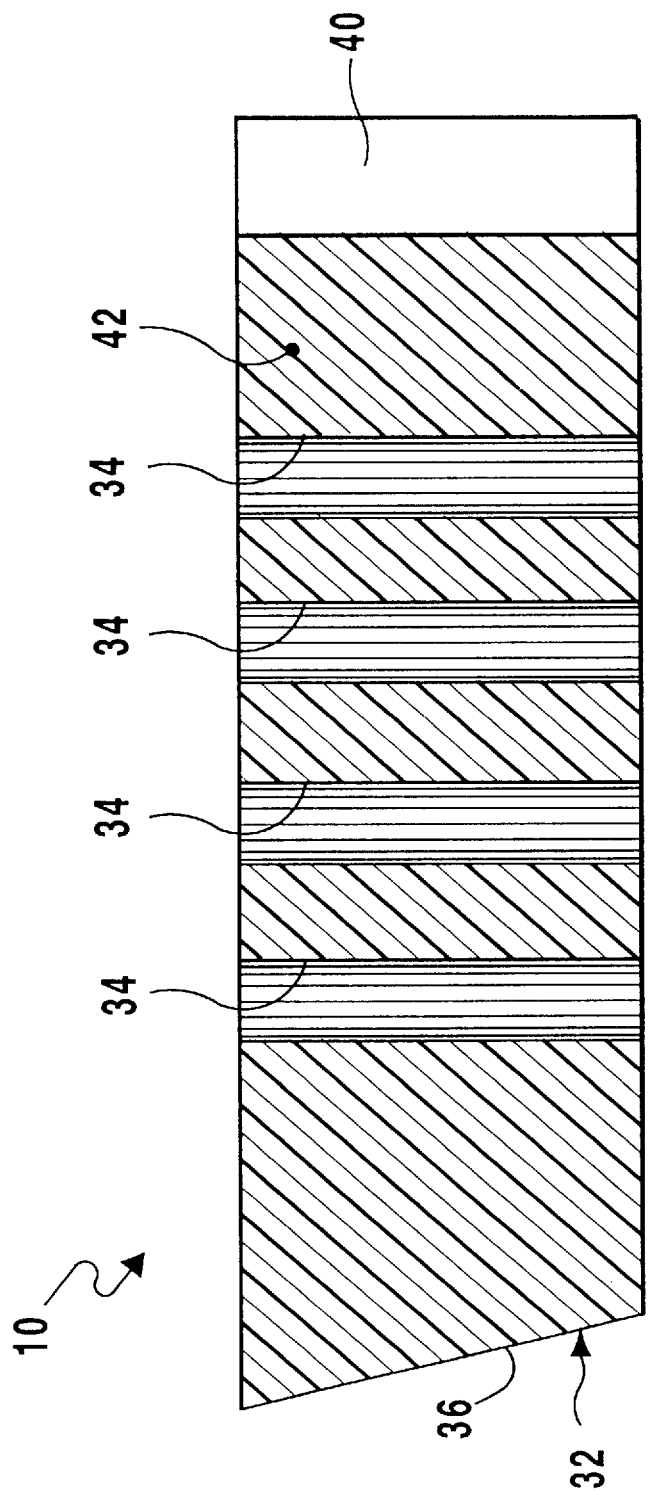
FIG. 6 is a cross sectional view taken along line 6—6 in FIG. 4.
Figure 7:
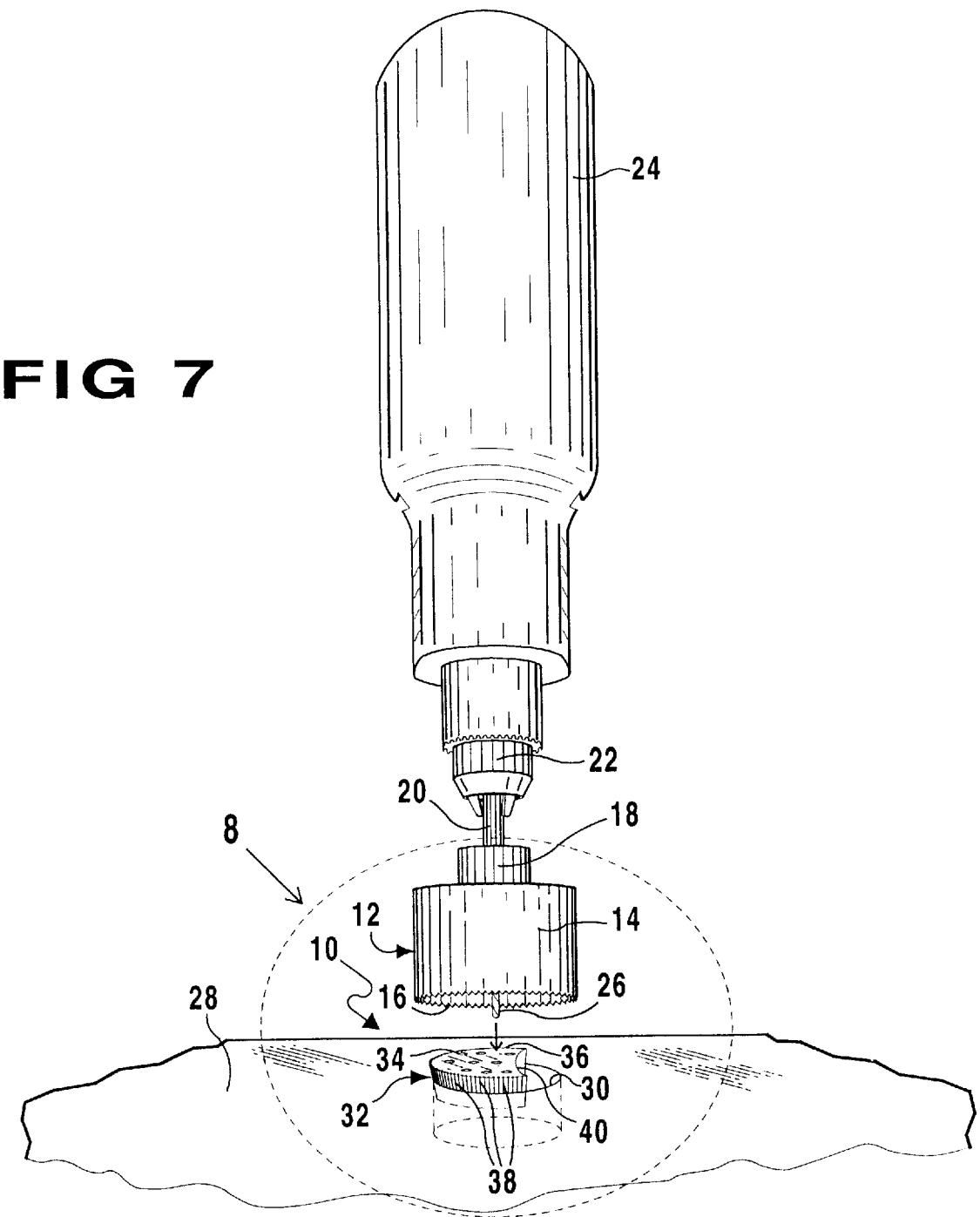
FIG. 7 is a perspective view, showing the present invention inserted into the predrilled opening in a workpiece, and the pilot drill bit of the hole saw which is connected via a shank to a chuck of a drill ready to be inserted into the center hole of the dowel plug.
Figure 8:
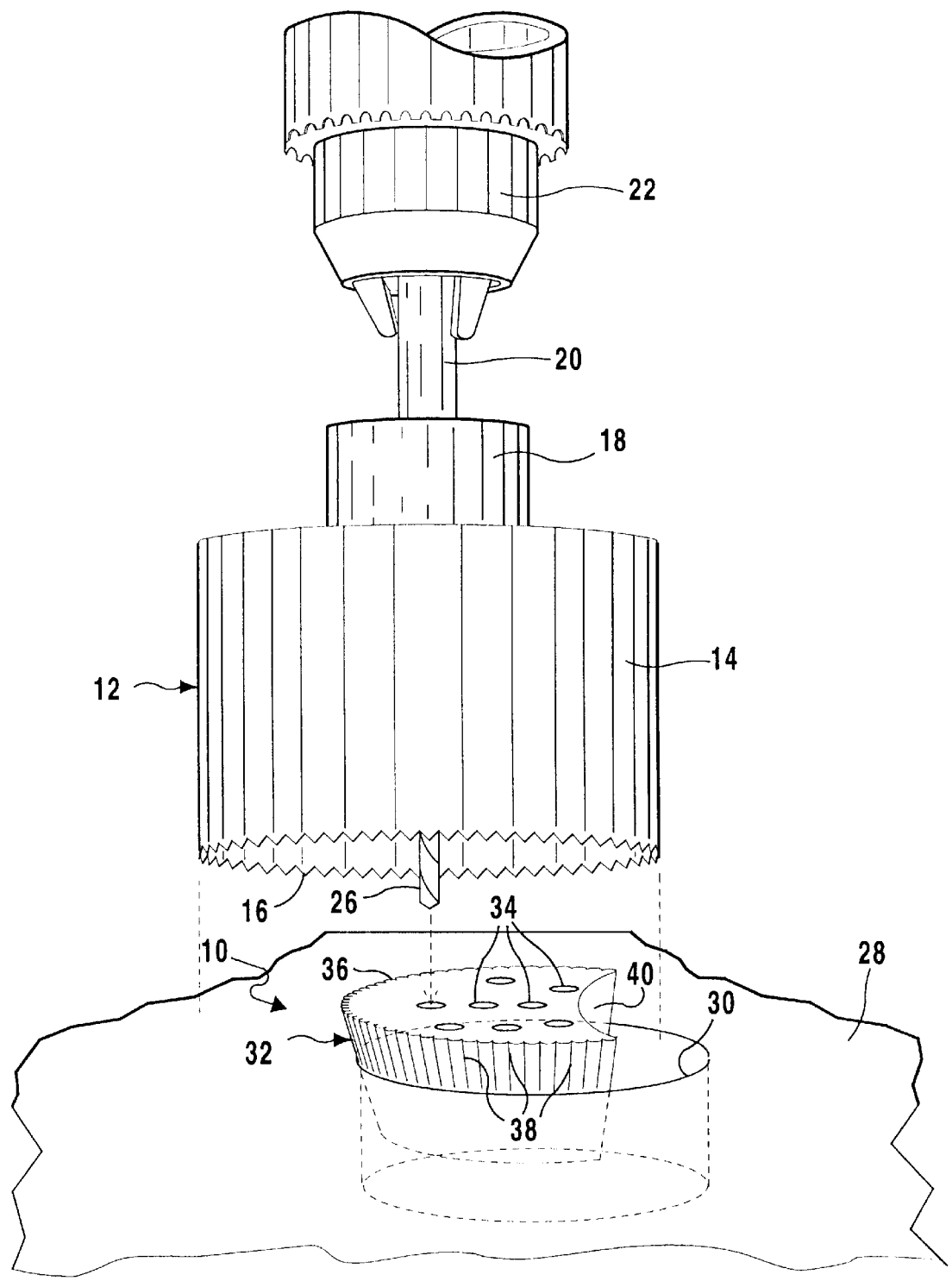
FIG. 8 is an enlarged perspective view of an area in FIG. 7 as indicated by arrow 8, with the pilot drill bit of the hole saw ready to be inserted into one of the spiral radiating repositioning center holes in the dowel plug.

The dowel plug 32, as shown in FIG. 6, is fabricated out of a strong durable material 42, wherein the strong durable material 42 is plastic. As shown in FIGS. 1 through 4, the dowel plug 32 is made in a plurality of various sizes, so that any one of the dowel plugs 32 can be inserted into the predrilled opening 30 in the workpiece 28, which is of a matching size.

Figure 9:
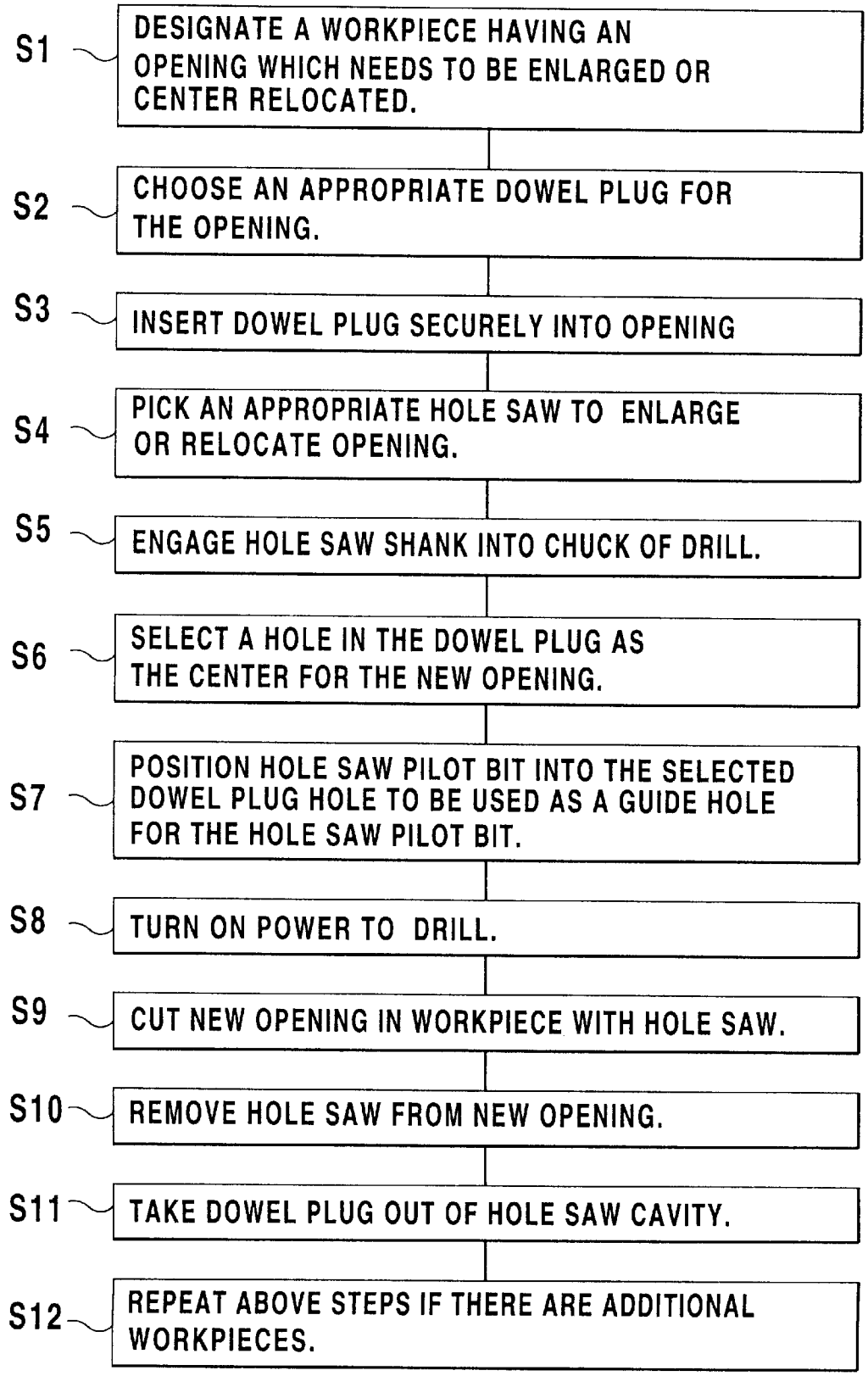
FIG. 9 is a flow diagram, showing the steps taken for enlarging and center displacing the predrilled opening in the work piece.

FIG. 9 shows a block diagram illustrating a method of enlarging and center displacing the predrilled opening 30 in the workpiece 28, which comprises the steps of:

S1) Designating the workpiece 28 having the predrilled opening 30 which needs to be enlarged or center relocated.

S2) Choosing an appropriate dowel plug 32 for the predrilled opening 30 in the workpiece 28.

S3) Inserting the dowel plug 32 securely into the predrilled opening 30 in the workpiece 28.

S4) Picking an appropriate hole saw 12 to enlarge or relocate the opening 30 in the workpiece 28.

S5) Engaging the shank 20 of the hole saw 12 into the chuck 22 of the drill 24.

S6) Selecting one hole 34 of the plurality of holes 34 in the dowel plug 32 as the center for the new opening.

S7) Positioning the pilot bit 26 of the hole saw 12 into the selected hole 34 in the dowel plug 32 to be used as a guide hole for the pilot bit 26 of the hole saw 12.

S8) Turning on the power to the drill 24.

S9) Cutting a new opening in the workpiece 28 with the hole saw 12.

S10) Removing the hole saw 12 from the new opening.

S11) Taking the dowel plug 32 out of a cavity in the hole saw 12.

S12) Repeating the above steps if there are additional workpieces 28 having predrilled openings 30 which need to be enlarged or center relocated.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device for use in combination with a hole saw of the type including a cylindrical hollow body having a circular lower cutting edge, a top mandrel with a shank in engagement with a chuck of a drill and a pilot bit for guiding the hole saw when cutting a new opening in a workpiece having a predrilled opening, in which the center of the new opening lies within the predrilled opening, the device comprising a dowel plug having a plurality of holes therethrough, said dowel plug is inserted into the predrilled opening, so that the pilot bit of the hole saw can be positioned in a rotatable manner into one of said holes in said dowel plug on center or off center with the predrilled opening in the workpiece.

2. A device as recited in claim 1, wherein said dowel plug includes an inwardly tapered circumference, so that said dowel plug can snugly fit into, but not pass through, the predrilled opening in the workpiece.

3. A device as recited in claim 2, wherein said dowel plug includes a plurality of knurls formed on said inwardly tapered circumference to aid in gripping an inner surface of the predrilled opening in the workpiece.

4. A device as recited in claim 2, wherein said dowel plug includes said inwardly tapered circumference having a concave cutout side less than a one hundred and twenty degree angle, to prevent the hole saw when off center from the predrilled opening from causing damage to said dowel plug when cutting the new opening in the workpiece.

5. A device as recited in claim 1, wherein one of said holes in said dowel plug is centrally located in a concentric relationship with the predrilled opening in the workpiece.

6. A device as recited in claim 2, wherein other of said holes in said dowel plug are in spiral radiating locations about said centrally located hole, so as to allow for finer repositioning and more varied positions for the pilot bit of the hole saw when cutting the new opening in the workpiece.

7. A device as recited in claim 1, wherein said dowel plug is fabricated out of a strong durable material.

8. A device as recited in claim 7, wherein said strong durable material is plastic.

9. A device as recited in claim 1, wherein said dowel plug is made in a plurality of various sizes, so that any one of said dowel plugs can be inserted into the predrilled opening in the workpiece which is of a matching size.

10. A method of enlarging and center displacing a predrilled opening in a workpiece, which comprises the steps of:

a) designating the workpiece having the predrilled opening which needs to be enlarged or center relocated;

b) choosing an appropriate dowel plug for the predrilled opening in the workpiece;

c) inserting the dowel plug securely into the predrilled opening in the workpiece;

d) picking an appropriate hole saw to enlarge or relocate the opening in the workpiece;

e) engaging a shank of the hole saw into a chuck of a drill;

f) selecting one hole of a plurality of holes in the dowel plug as the center for the new opening;

g) positioning a pilot bit of the hole saw into the selected hole in the dowel plug to be used as a guide hole for the pilot bit of the hole saw;

h) turning on the power to the drill;

i) cutting a new opening in the workpiece with the hole saw;

j) removing the hole saw from the new opening;

k) taking the dowel plug out of a cavity in the hole saw; and l) repeating the above steps if there are additional workpieces having predrilled openings which need to be enlarged or center relocated.

11. A device for use in combination with a hole saw of the type including a cylindrical hollow body having a circular lower cutting edge, a top mandrel with a shank in engagement with a chuck of a drill and a pilot bit for guiding the hole saw when cutting a new opening in a workpiece having a predrilled opening, in which the center of the new opening lies within the predrilled opening, the device comprising a dowel plug having a plurality of holes therethrough, said dowel plug is inserted into the predrilled opening, so that the pilot bit of the hole saw can be positioned in a rotatable manner into one of said holes in said dowel plug on center or off center with the predrilled opening in the workpiece, wherein said dowel plug includes an inwardly tapered circumference, so that said dowel plug can snugly fit into, but not pass through, the predrilled opening in the workpiece.

12. A device as recited in claim 11, wherein said dowel plug includes a plurality of knurls formed on said inwardly tapered circumference to aid in gripping an inner surface of the predrilled opening in the workpiece.

13. A device as recited in claim 12, wherein said dowel plug includes said inwardly tapered circumference having a concave cutout side less than a one hundred and twenty degree angle, to prevent the hole saw when off center from the predrilled opening from causing damage to said dowel plug when cutting the new opening in the workpiece.

14. A device as recited in claim 13, wherein one of said holes in said dowel plug is centrally located in a concentric relationship with the predrilled opening in the workpiece.

15. A device as recited in claim 14, wherein other of said holes in said dowel plug are in spiral radiating locations about said centrally located hole, so as to allow for finer repositioning and more varied positions for the pilot bit of the hole saw when cutting the new opening in the workpiece.

16. A device as recited in claim 15, wherein said dowel plug is fabricated out of a strong durable material.

17. A device as recited in claim 16, wherein said strong durable material is plastic.

18. A device as recited in claim 17, wherein said dowel plug is made in a plurality of various sizes, so that any one of said dowel plugs can be inserted into the predrilled opening in the workpiece which is of a matching size.

* * * * *